(12) United States Patent
Cuny et al.

(10) Patent No.: US 8,075,294 B2
(45) Date of Patent: Dec. 13, 2011

(54) TIRE MOLD AND TIRE WITH INTERNAL GROOVES IN SHOULDER AREA

(75) Inventors: André Cuny, Habay La Neuve (BE);
Frank Pierre Severens, Arlon (BE);
Jean Joseph Victor Collette, Arlon (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 302 days.

(21) Appl. No.: 12/578,613

(22) Filed: Oct. 14, 2009

(65) Prior Publication Data
US 2010/0159047 A1  Jun. 24, 2010

Related U.S. Application Data

(60) Provisional application No. 61/139,284, filed on Dec. 19, 2008.

(51) Int. Cl.
*B29C 35/02* (2006.01)
(52) U.S. Cl. ......................................................... 425/37
(58) Field of Classification Search ..................... 425/37
See application file for complete search history.

(56) References Cited

U.S. PATENT DOCUMENTS

| | | | |
|---|---|---|---|
| 1,666,883 A | | 4/1928 | Lambert |
| 3,096,541 A | * | 7/1963 | Sindelar ........................ 425/37 |
| 4,143,114 A | * | 3/1979 | Smith et al. ................... 264/326 |
| 7,338,269 B2 | * | 3/2008 | Delbet et al. .................... 425/37 |
| 2002/0142056 A1 | | 10/2002 | Aperce et al. ................. 425/28.1 |
| 2007/0077320 A1 | | 4/2007 | Delbet et al. ................. 425/28.1 |

FOREIGN PATENT DOCUMENTS

| | | |
|---|---|---|
| EP | 0 468 154 A2 | 1/1992 |
| EP | 1 125 709 A1 | 8/2001 |
| GB | 865480 A | 4/1961 |
| JP | 08 142057 A | 6/1996 |
| WO | 2008/009724 A1 | 1/2008 |

OTHER PUBLICATIONS

European Search Report —Apr. 7, 2010.

* cited by examiner

*Primary Examiner* — James Mackey
(74) *Attorney, Agent, or Firm* — June E. Rickey

(57) ABSTRACT

A tire mold is described that includes a plurality of tread molding segments having an inner surface for molding the tire tread. The mold further includes a plurality of sidewall plates having an inner surface for molding the tire sidewall. The tread mold segments together with the sidewalls cooperate to form a tire molding cavity. The sidewall plate further comprises a slot that extends from the outer surface of the tread segment to the inner mold surface, and has a piston having a head slidably received in the slot. A pin is positioned between the piston head and an end of the slot. The mold further includes actuating means for actuating the piston in the slot when the mold is closed.

3 Claims, 4 Drawing Sheets

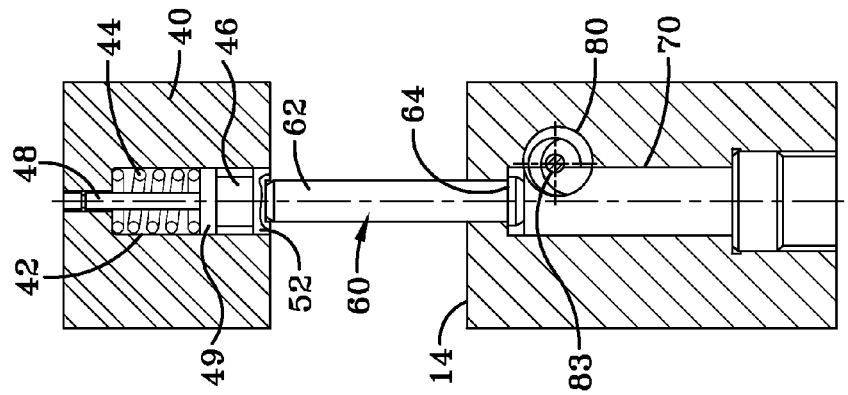
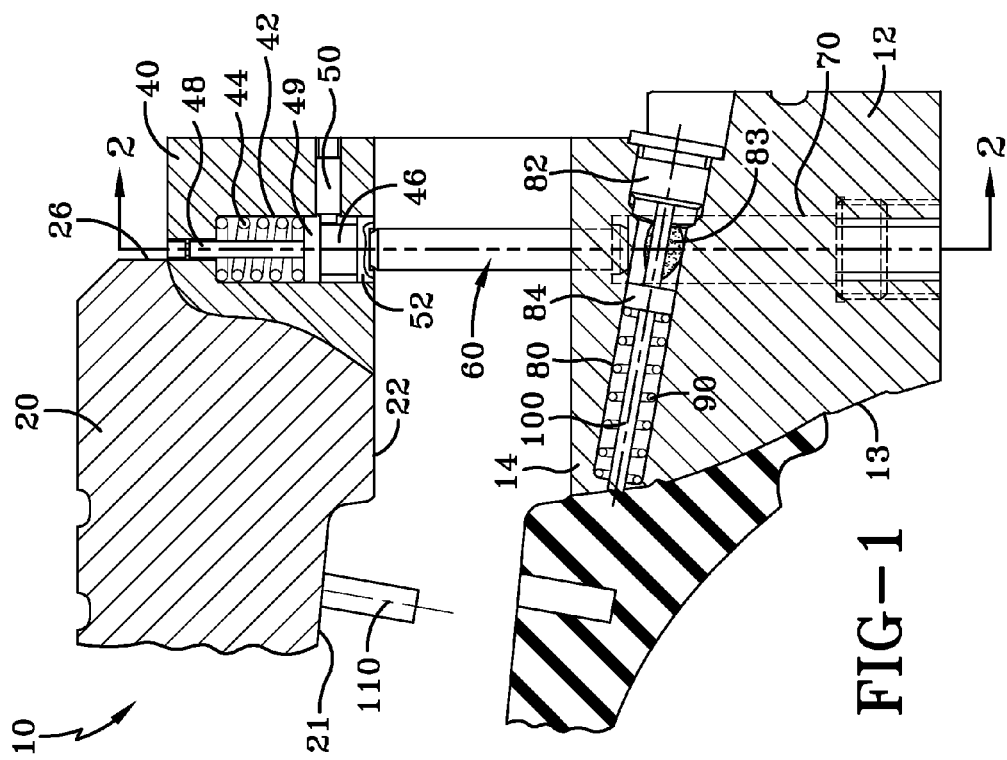

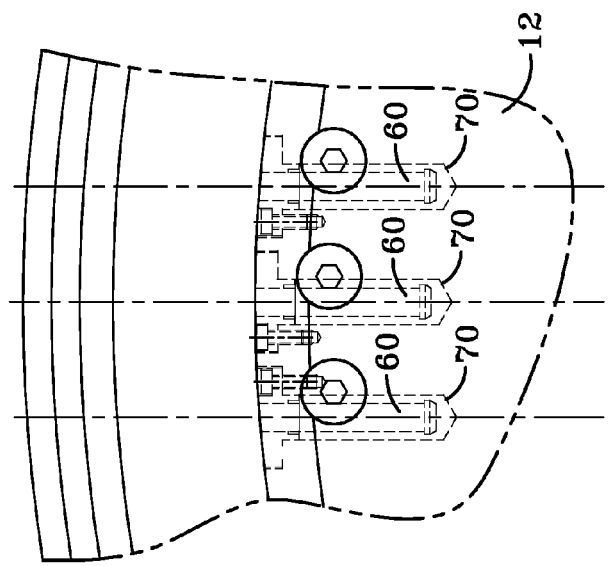
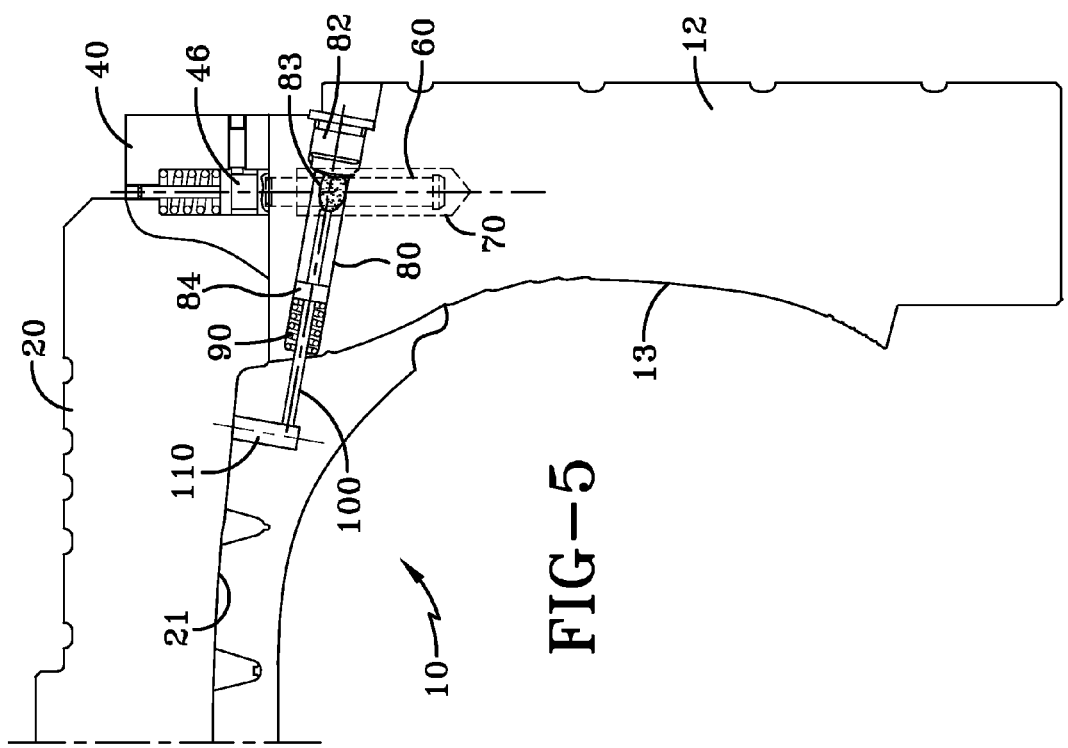

TIRE MOLD AND TIRE WITH INTERNAL GROOVES IN SHOULDER AREA

This application claims the benefit of and incorporates by reference U.S. Provisional Application No. 61/139,284 filed Dec. 19, 2008.

FIELD OF THE INVENTION

The invention relates to a tire mold and a pneumatic tire having grooves in the shoulder area oriented in the axial direction.

BACKGROUND OF THE INVENTION

Creation of internal grooves in the shoulder area of a tire that are oriented axially may have several advantages. First, the axial grooves may decrease the heat generation in the tire that is built up when the tire is rolling. Second, the grooves may evacuate the water by the tire side during operation on a vehicle, which may improve the visibility of drivers behind the vehicle. The grooves also provide tire flexibility in the shoulder area which may improve tire performance. The grooves may also be used to mount temperature sensing devices to monitor the shoulder temperature. The grooves may be also used to install retractable stud pins for enhanced winter driving.

DEFINITIONS

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers "Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

BRIEF DESCRIPTION OF THE DRAWINGS

The invention will be described by way of example and with reference to the accompanying drawings in which:

FIG. 1 is a front cross-sectional view of a tire mold apparatus shown in the open position;

FIG. 2 is a side view of the mold apparatus of FIG. 1;

FIG. 5 is the tire mold apparatus of FIG. 1 shown in the closed position;

FIG. 6 is a side view of the tire mold of FIG. 5;

DETAILED DESCRIPTION OF THE INVENTION

Figure 3:
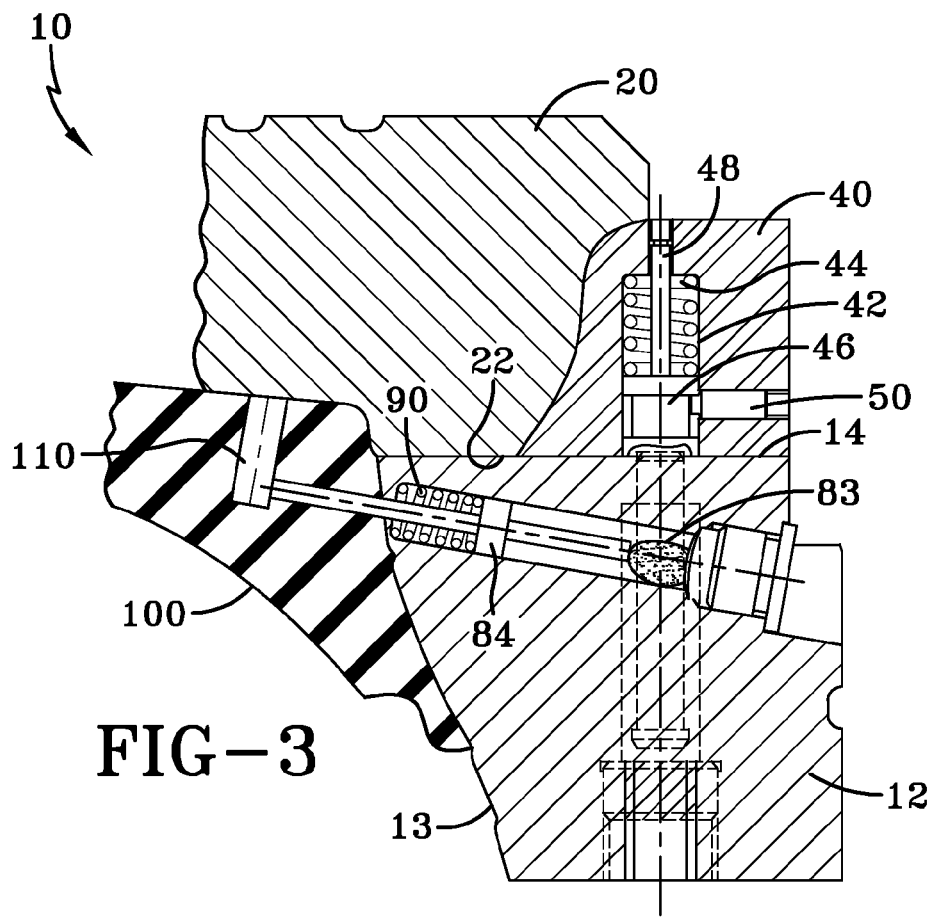
FIG. 3 is a close-up cross-sectional view of the tire mold of FIG. 1 shown in the closed position.
Figure 4:
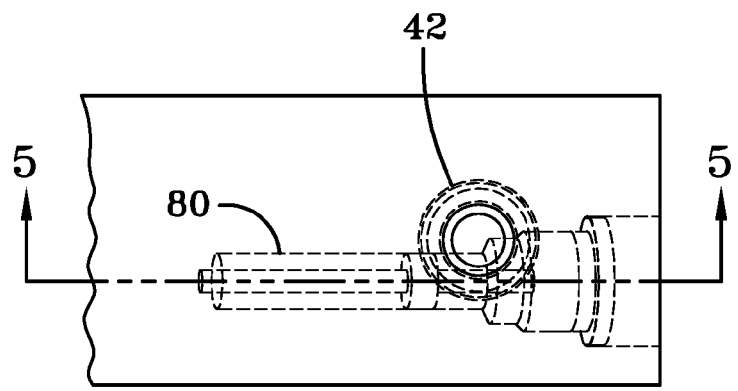
FIG. 4 is a top cross-sectional view of a portion of the mold of FIG. 1.
Figure 8:
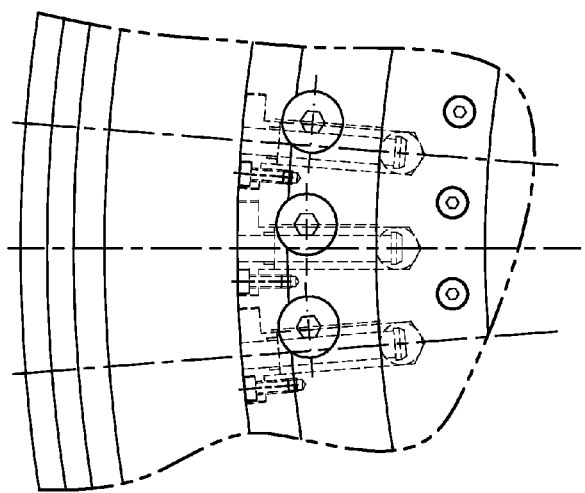
FIG. 8 is a side view of the tire mold of FIG. 7.

Referring to the drawings and particularly to FIGS. 1-6, a first embodiment of a portion of a tire mold apparatus is shown. The tire mold apparatus is useful for molding lateral grooves in the side of a tire. The tire mold 10 comprises a first and second sidewall plate 12 (only 1 shown) which may be mounted to a lower platen (not shown). The sidewall plates 12 have an inner surface 13 for molding the tire sidewall. The tire mold 10 further comprises a plurality of tread molding segments 20 having an inner surface 21 for molding the tire tread. The tread molding segments 20 further comprise a flanged portion 22 which engages the radially outer surface 14 of the sidewall plate. The tread mold segments together with the sidewalls cooperate to form a tire molding cavity.

The tread molding segments cooperate with an annular ring 40 which may be integrally formed with the tread molding segments 20 or retrofitted to the outer surface 26 of the tread segments 20.

The annular ring 40 includes one or more radially oriented holes 42 in which a blocking member 46 is received therein. The blocking member 46 has a pin 48 extending radially outward from a first end 49 of the blocking member 46. The pin 48 extends through a spring 44. The spring 44 is constrained by the first end 49 of the blocking member and the radially outer end of the hole 42. A second end 52 of the blocking member is flush with the outer flange surface 22 of the tread segment 20. The blocking member is retained in the hole via a locking pin, screw or other locking device 50. The blocking member can thus move radially outward in the hole 42, until the spring force overcomes the force on the blocking member. The blocking member is prevented from moving radially inward by the locking pin.

The second end 52 of the blocking member engages with a first end 62 of a compression pin 60. The compression pin has a second end 64 received in a second radially oriented hole 70 located in the sidewall plate. The second hole 70 is in radial alignment with the hole 42 of the tread segment. The compression pin 60 is lowered into hole 70 as the mold closes, bringing the tread segment flange into mating engagement with the radially outer surface 14 of the sidewall plate. FIG. 5 illustrates the mold in the closed position, showing the compression pin fully positioned within hole 70. The lowering of the compression pin activates pin into engagement with a tire shoulder received in the mold, as described in more detail, below.

The sidewall plate further comprises an angled slot 80 that extends from the outer surface of the tread segment to the inner mold surface 13. As best shown in FIG. 2, the hole 70 intersects the angled slot 80. The angled slot 80 has a screw stopper 82 which functions to plug the hole 80 and to be removable for servicing. A plunger or piston 84 has a distal end 85 located adjacent the screw stopper 82. Positioned between the plunger and the stopper is a pressure sensitive and temperature resistant block 83 of material such as silicone. The piston further comprises a head 86 that is slidable within slot 80. The head 86 is oriented for engagement with a second spring 90. A pin 100 is received within the slot and is positioned inside of the second spring 90. The pin 100 is actuated by the plunger as the mold closes. As the mold closes, the compression pin 60 is lowered into the radially oriented hole 70. As the compression pin is lowered, the pin interferes with the block of material in the slot 80, resulting in a reduced volume of the slot. The block of material is squeezed out of the slot adjacent the pin into engagement with the piston. The piston is actuated by the block of material resulting in the pin 100 being actuated axially into a tire within the tire mold. The pin thus forms the axial grooves in the sidewall of the tire in the mold. FIG. 3 illustrates the mold in the closed position with the pin extended. As shown, the pin engages a mold projection 110 which extends from the outer surface of the tread segment. The end of the mold projection 110 has a hole which provides a path for the displaced rubber to travel.

The first and second springs are selected such that the starting force of the first spring is greater than the ending force of the second spring. The function of the spring mechanism in the tread segment is to allow for dilation of the block of material, and is optional.

The mold pin device as described above may be placed at numerous circumferential orientations about the tire as desired.

Figure 7:
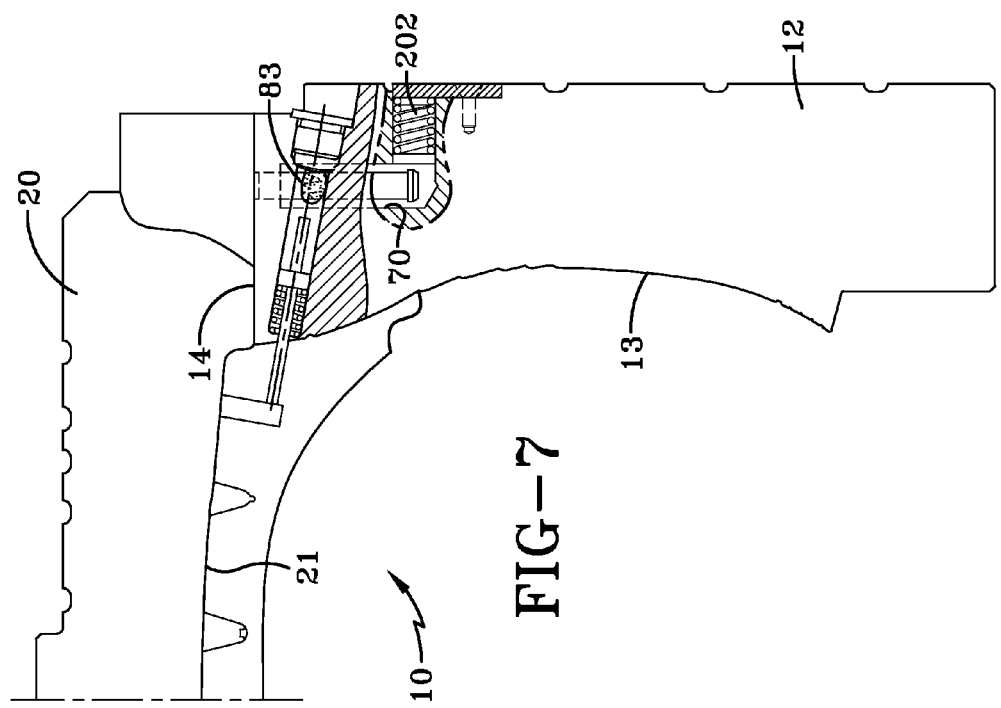
FIG. 7 is a front cross-sectional view of a second embodiment of a tire mold apparatus shown in the closed position.

FIG. 7 illustrates an alternate embodiment of the invention wherein the spring mechanism to allow for dilation of the material has been moved to the sidewall from the tread segment. Operation of the assembly is essentially the same. A spring 202 is located in the sidewall plate near the lower end of hole 70. The spring 202 allows resiliency of the compression pin.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire mold comprising: a plurality of tread molding segments having an inner surface for molding the tire tread, and a plurality of sidewall plates having an inner surface for molding the tire sidewall, wherein the tread mold segments together with the sidewalls cooperate to form a tire molding cavity; wherein said sidewall plate further comprising a slot that extends from the outer surface of the tread segment to the inner mold surface, and having a piston having a head slidably received therein; wherein a pin is positioned between the piston head and an end of the slot, wherein said mold further comprises actuating means for actuating said piston in said slot when said mold is closed.

2. The mold of claim 1 wherein a pressure sensitive block of material is positioned within the slot.

3. The mold of claim 2 wherein the mold further comprises a radially oriented hole for receiving a compression pin, wherein a portion of the radially oriented hole intersects with the slot, so that as the compression pin is lowered into the radially oriented hole, the Pressure sensitive material engages the piston causing the piston to actuate the pin into the tire mold cavity, into a tire.

* * * * *